INVENTOR
George J. Ehni, III

ATTORNEYS

Aug. 11, 1970     G. J. EHNI III     3,524,185
ANNUNCIATOR SYSTEM WITH SEQUENCE INDICATION
Filed Oct. 24, 1966     5 Sheets-Sheet 5
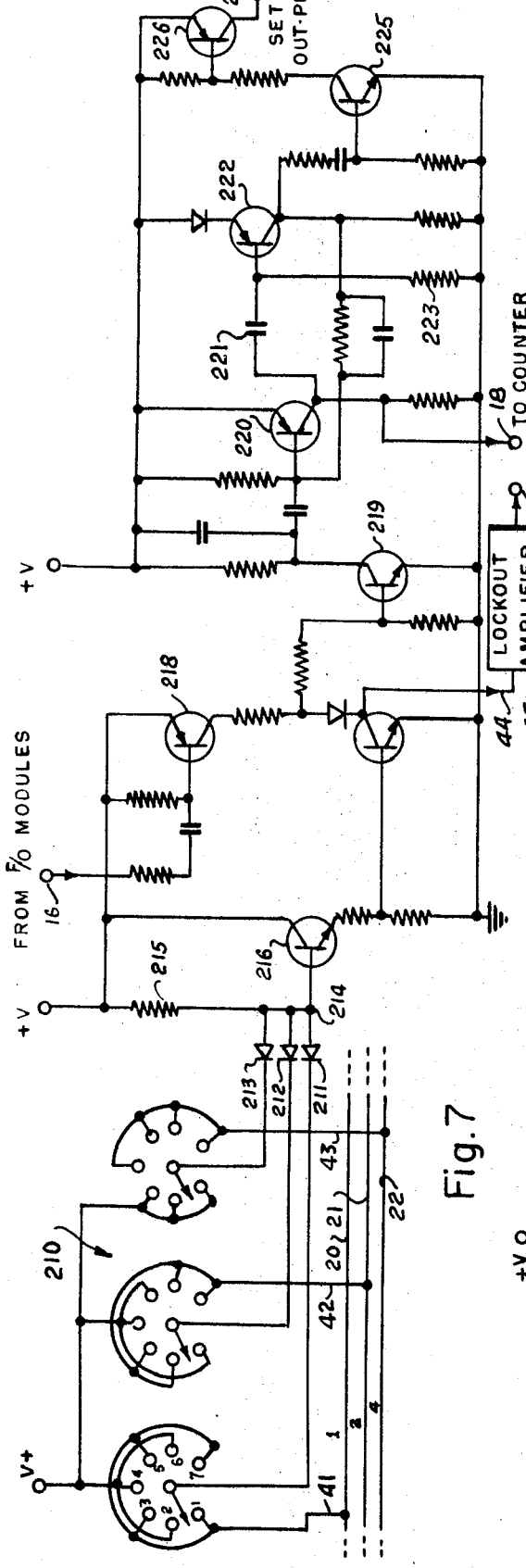
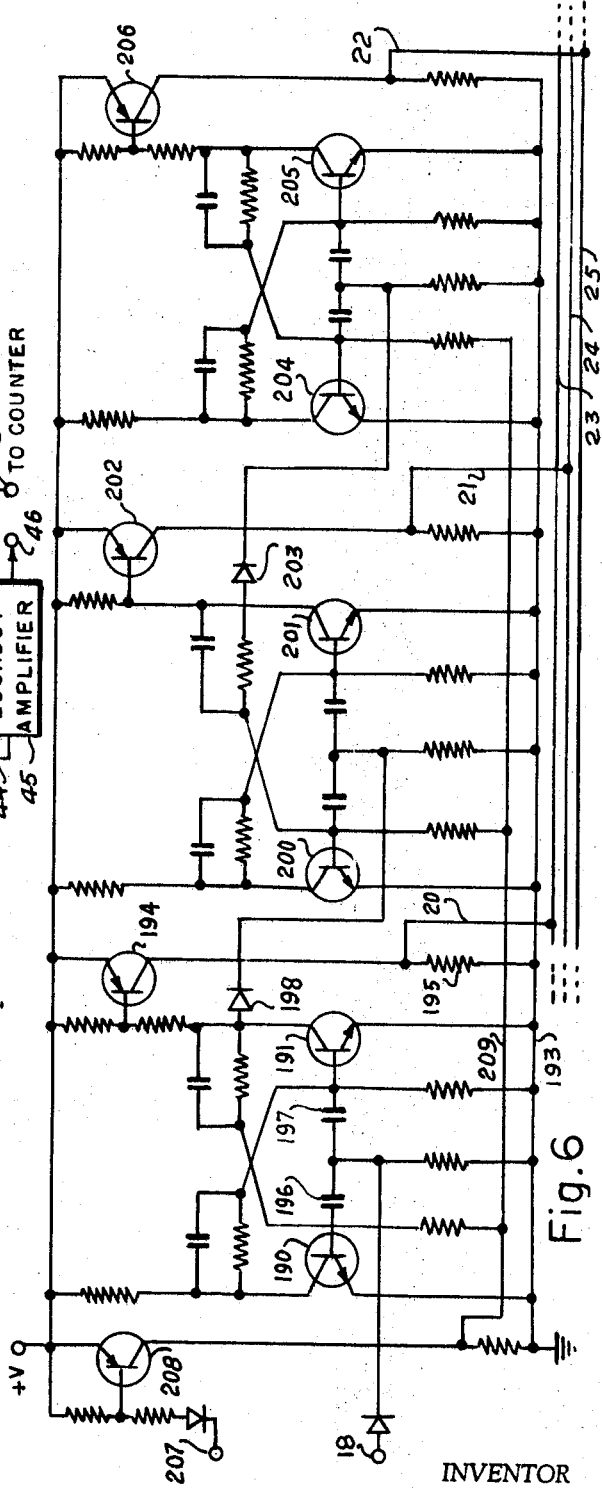
INVENTOR
George J. Ehni, III
BY
ATTORNEYS United States Patent Office 3,524,185
Patented Aug. 11, 1970

3,524,185
ANNUNCIATOR SYSTEM WITH
SEQUENCE INDICATION
George J. Ehni III, Dallas, Tex., assignor to Beta
Corporation, Dallas, Tex., a corporation of Texas
Filed Oct. 24, 1966, Ser. No. 588,817
Int. Cl. G08b 21/00
U.S. Cl. 340—415                 7 Claims

ABSTRACT OF THE DISCLOSURE

An annunciator system including a plurality of field contacts with each field contact having associated therewith an indicator module for providing an indication of a malfunction and a memory element. A counter and a means for producing a set output a predetermined time interval following application of a pulse to the counter advancing the count stored in the counter. Each time one of the field contacts becomes abnormal a pulse is applied to advance the count in the counter. When the set output is produced, the count stored in the counter will be stored in the memory element whose associated field contact is abnormal and which does not have an existing count stored therein. After a predetermined number of the field contacts become abnormal, a lock-up out pulse is applied to the indicator modules to cause indication provided responsive to additional ones of the field contacts becoming normal to be different and to prevent storage of the counter count in the memory.

---

This invention relates to annunciator systems for monitoring the operation of various types of processes and equipment and indicating the presence of malfunctions therein, and more particularly to an annunciator system which produces upon command an indication of the sequence or order in which malfunctions occurred in a large number of different monitored conditions.

The processes and systems used in operations such as employed in utility plants, chemical processing plants, pump stations and the like, are often monitored and controlled from a central control console which would usually be remote from most of the equipment or stations being monitored. The central control console commonly employs an annunciator system which is connected to selected stations from monitoring the operation of the process or equipment. In the event of a malfunction or abnormal condition at any of the monitored stations, a visual and audible signal device is energized for advising the operator of the presence of the malfunction. In many types of processes, failure or malfunction at some point in the system can result in extensive damage to the equipment in other parts of the system if the over-all operation is permitted to continue. Accordingly, it is common to provide automatic shut-down equipment at virtually every station to terminate operation when the conditions reach an abnormal state. The result of this automatic shut-down is that following a malfunction at one piece of equipment, a chain reaction will occur wherein many other pieces of the equipment will shut down and produce malfunction indications. This may occur in such rapid sequence that at the control console it may appear to the operator that a large number of malfunctions have occurred virtually simultaneously. For this reason, annunciator systems have been provided which produce an indication of a different type for the malfunction that occurred first, this being referred to as a "first-out" system. While first-out systems of this type are available which produce an identification of the particular piece of equipment which first malfunctioned, it is sometimes necessary, in tracing the character of the shut-down in order to initiate corrective action, to be able to readily identify the sequence in which the various stations being monitored produced malfunction indications.

It is the principal object of this invention to provide an annunciator system adapted for monitoring the operation of a large number of stations and for producing indications to an operator at a central console of the malfunction at such stations, the type of indication produced being different for malfunctions occurring early in the sequence. Primarily, it is the object to provide such an annunciator system wherein the actual order or sequence of the occurrence of malfunctions, at least for the first few pieces of equipment which shut down, will be readily available to the operator in display form.

In accordance with this invention, an annunciator system is provided which may utilize a large number of indicator units each of which is responsive to a malfunction condition in a different piece of monitored equipment and which functions to produce a visual indication such as a flashing light and/or horn upon the occurrence of a malfunction. The indication may be switched from one type to another, i.e. from a flashing light to a continuous light, and the horn be de-energized, after the operator has acknowledged. Also, the type of indication may be different for malfunctions occurring early in the sequence as distinguished from later in the shut-down sequence. Each of the indicator units produces a signal which is applied to a counting device which will register the number of signals received or malfunctions which have occurred. Since it is of interest to the operator to determine the actual sequence for only the first few malfunctions which occur, the counting device may be operable to register only a selected number of the count signals from the indicator units. Each of the indicator units has associated therewith a storage device which receives the output from the counting device and functions to store the number registered in the counter for later read-out. It will be understood that a number will be stored only for the particular indicator unit which has at that point just produced a malfunction indication. After the selected number of malfunctions has occurred, none of the succeeding malfunctions will operate to cause a number to be stored in the storage device associated with the indicator unit wherein such malfunctions occur. A display device is provided which produces a visual or other indication of the numerical sequence of occurrence of malfunctions in the indicator units at which the selected number of malfunctions occurred. This display device may be in the form of a digital display unit which may be selectively connected to each of the storage devices at the discretion of the operator at the control console.

The annunciator system of this invention may thus provide to an operator a display of malfunction indications for a large number of monitored stations, with the indications associated with the first several malfunctions to occur being different from the remainder. Further, a display of the actual numerical sequence of the first several malfunctions may be readily identified so that the necessary steps for repair or correction of the monitored system may be more quickly initiated.

The novel features which are believed characteristic of this invention are set forth in the appended claims. The invention itself, however, as well as further objects and advantages thereof, will best be understood by reference to the following detailed description of a particular embodiment, read in conjunction with the accompanying drawings, wherein:

FIG. 6 is a schematic diagram of an electronic circuit which may be used to provide the counter function in the system of FIG. 1; and FIG. 7 is a schematic diagram of a circuit for use as the gate and delay function in the input of the counter in the system of FIG. 1.

Figure 1:
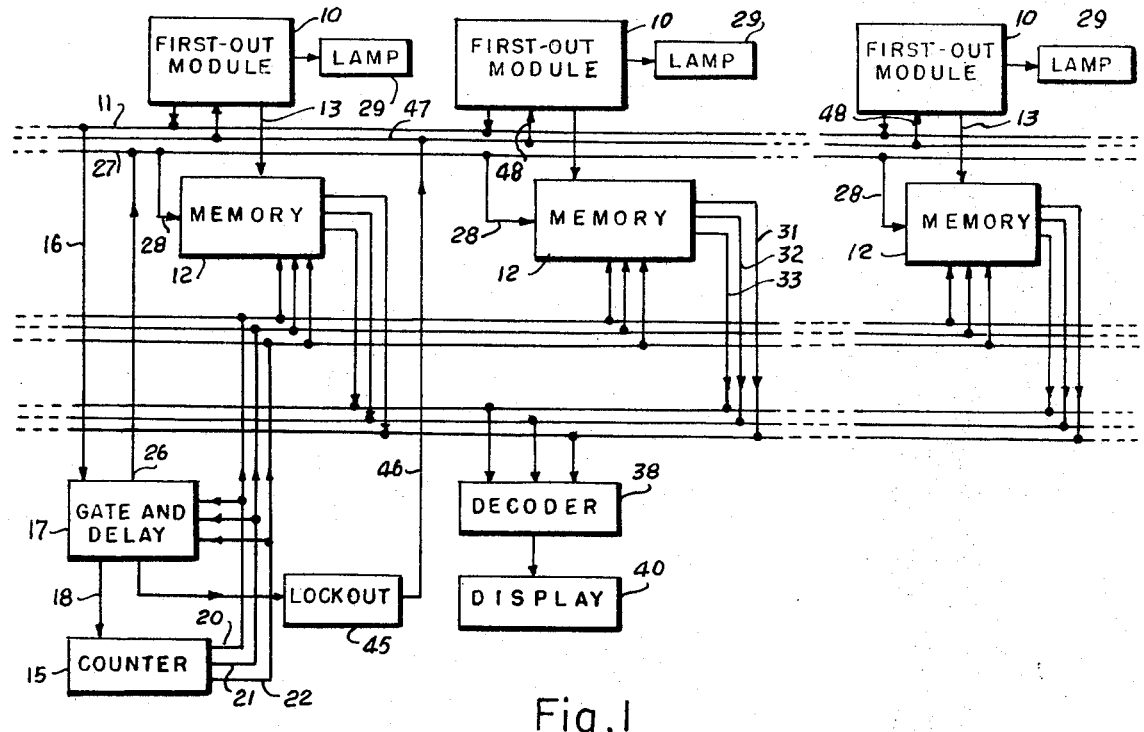
FIG. 1 is a block diagram of an annunciator system according to this invention.

With reference to FIG. 1, an annunciator system providing the improved functions of this invention is illustrated in block diagram form. In such a system, a large number of indicator modules 10 are provided for the purpose of detecting the presence of selected abnormal conditions or malfunctions in a system which is to be monitored. Typically, an annunciator of this type is used to monitor operations such as in utility plants, chemical processing plants, pump stations, and the like. One of these modules 10 would be associated with each condition to be monitored. Ordinarily, the conditions of variables of interest would be items such as pressure, temperature, liquid level, motor speed, voltage or current level, fluid flow, etc. When such conditions are abnormally low or high, the modules 10 are individually actuated by the opening or closing of electrical contacts or switches in the equipment being monitored. Thus the modules 10 are activated for the purposes of the system of FIG. 1 merely by the opening of normally closed contacts or the closing of normally open electrical contacts, either of which will be considered to be a malfunction. Upon the occurrence of a malfunction detected by any one of the modules 10, the module produces an output pulse applied to a bus line 11. These pulses are counted and used for the function of recording the sequence in which the malfunctions occurred as will be subsequently explained. Each of the modules 10 when activated also simultaneously produces an enabling voltage which is applied to one of a number of memory circuits 12 by lines 13. A separate one of the memory circuits 12 is associated with each of the modules 10 and each of these circuits functions to store a numerical indication of the sequence in which the malfunctions occur. This numerical indication is derived by means of a counter 15 which receives the negative pulses from the line 11 by a line 16 and a gate and delay circuit 17 which will be explained below, the output of the gate and delay circuit being applied to the counter 15 at line 18. The pulses registered on the counter 15 result in a binary output which appears on three lines 20, 21 and 22 which are connected to a set of bus lines 23, 24 and 25 for connection individually to each of the memory circuits 12. The memories 12 are enabled after a short delay from the occurrence of the malfunction pulse on the line 11 by means of a set pulse generated in the circuit 17 and applied by an output line 26 to a bus line 27. The set pulse is applied by an input line 28 to each of the memories 12. The purpose of this delay of the set pulse is to permit the counter 15 to operate before attempting to enter a number into any of the memory circuits. When a given one of the modules 10 indicates a malfunction, it thus produces a negative pulse on the line 11 which then increases the number registered on the counter 15 by one, while at the same time such module produces an enabling voltage on the output 13 to its associated memory 12 so that as soon as the set pulse appears on the input 28 of this memory the numerical indication appearing on the lines 23–25 will be read into and stored in this memory 12. It will be noted that only one of the memories 12 will receive the proper enabling voltage to set this particular number into the memory, the others not being enabled. Subsequent malfunctions in other modules 10 will each increase the number registered on the counter 15 by one and cause the memory 12 associated with each such module to accept and store the number then produced at the counter output on lines 23–25.

Figure 2:
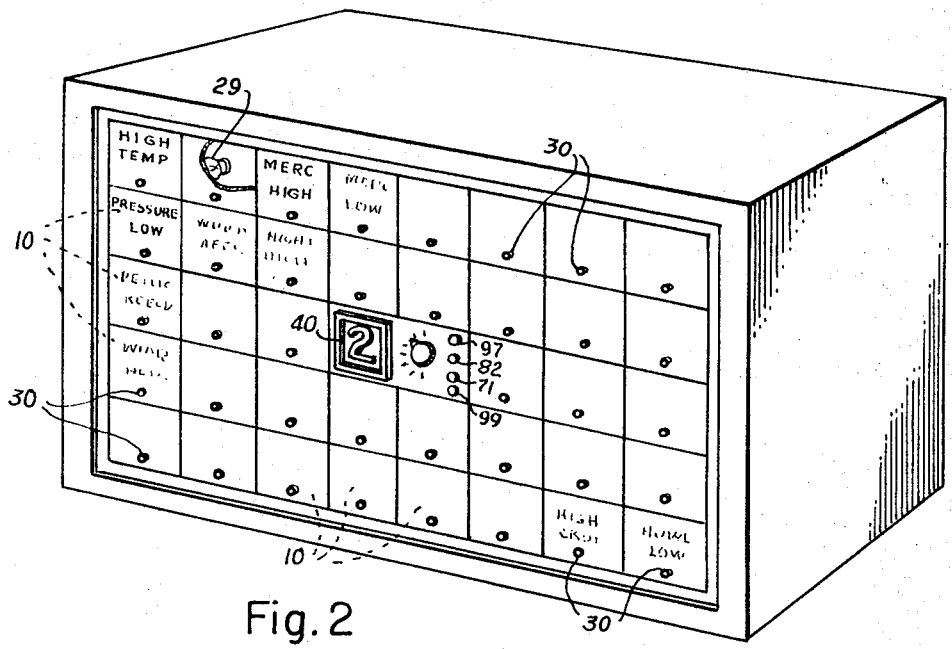
FIG. 2 is a front view of an indicator panel which may be used with the annunciator system of FIG. 1.

Associated with each of the modules 10 is an indicator lamp 29, and all of these lamps may be arranged on a suitable panel display, as will be seen in FIG. 2. There may be any number of the modules 10 and associated lamps 29, there being thirty-eight of these in the embodiment illustrated. Upon the occurrence of a malfunction in one of the modules, its lamp will be turned on, initially flashing, clearly visible to the operator at the panel of FIG. 2. In front of each of the modules 10 on the display panel is a translucent screen with a suitable legend inscribed on each screen to identify the function being monitored for each module. The lamps 29 are located just behind the screens to illuminate the screens. Of course, the circuity for each module 10 could be built up on suitable printed circuit boards and housed so that each module is a plug in unit along with its lamp and screen.

In order to determine the sequence in which the malfunctions occurred, the operator depresses one of a plurality of pushbuttons 30, one of these being associated with each of the memory circuits 12 and located on the appropriate one of the screens on the display panel. This causes the numerical indication stored in the selected memory to appear on output lines 31, 32 and 33. The output lines from each of the memory circuits 12 are all applied to three bus lines 34, 35 and 36 which are common to all of the memory circuits 12. These lines 34–36 are connected to the inputs of a decoder 38 which drives a display unit 40 so that the number stored in the memory 12 for which the readout button 30 is depressed will appear on the display 40, this number indicating the sequence of occurrence of the malfunction for this particular module 10.

The monitor or operator would ordinarily be interested in identifying the sequence of only the first several malfunctions which occur since the remaining ones usually will be merely part of a chain reaction caused by the first to occur. Accordingly, the system may be simplified considerably without loss of any operating advantage by providing for indication of only the first several malfunctions. To this end, the counter 15 registers only up to the first small number of malfunctions, seven for example, and thereafter the numerical sequence will not be entered into the memories 12 for subsequent malfunctions detected at the modules 10. To provide this function, the gate and delay circuit 17 includes means for first selecting how many of the malfunctions are to be counted and then for disenabling the memory circuits 12 and changing the operation of the modules 10 after this selected number has occurred. The gate and delay circuitry 17 receives the counter output from the lines 20–22 by input lines 41, 42 and 43, and functions to produce a lock-out signal at a line 44 which is applied through a lock-out amplifier 45 and a line 46 to a lock-out bus line 47 from which inputs 48 are applied to each of the modules 10. After the selected number of malfunctions have occurred, the modules 10 indicating subsequent malfunctions will be prevented from applying enabling voltages on the outputs 13 to the memory circuits 12. Thus no further number will be entered into the memory circuits 12 although the numbers already entered will remain for selective readout on the display 40. The lights 29, however, associated with these subsequent malfunctions will be energized, although these will be steady rather than flashing.

Figure 3:
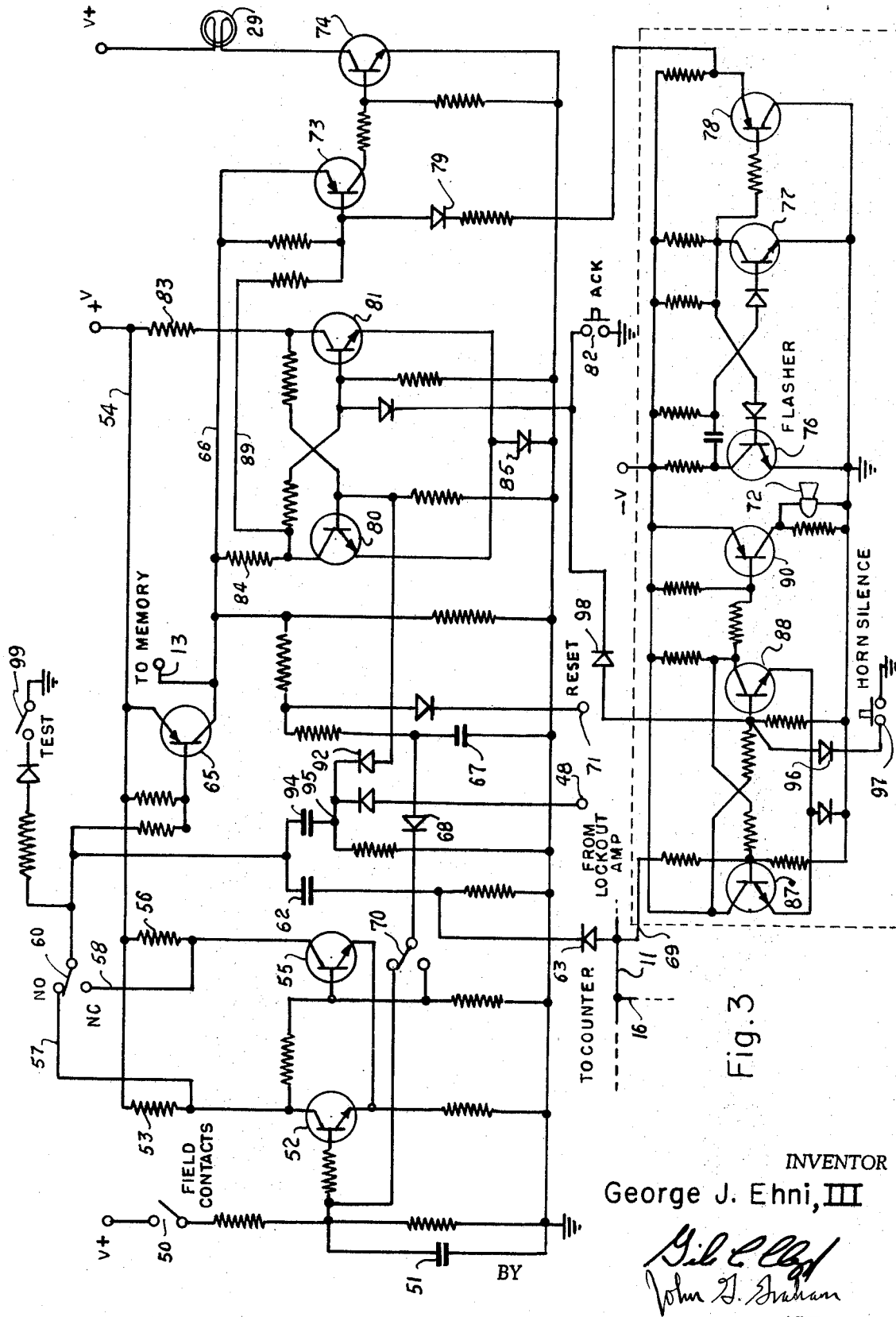
FIG. 3 is a schematic diagram of an electronic circuit which may be used for each of the indicator or "first-out" modules in the annunciator system of FIG. 1.

Circuits which may be used to implement the system of FIG. 1 will now be described. With reference to FIG. 3, a detailed, schematic diagram of one of the indicator or first-out modules 10 is illustrated, it being understood, of course, that all of the other modules 10 are exactly like the circuit of FIG. 3. The malfunction in the condition being monitored is manifested by closing of a normally open switch or pair of contacts 50, or alternatively, opening of normally closed contacts. The contacts 50 are in series with a positive voltage supply and a pair of resistors, with one of the resistors being shunted by a capacitor 51 which acts as a filter to prevent spurious signals or very short term closing or opening of the contacts 50 from affecting the system. Voltage across the capacitor 51 is applied through a resistor to the base of an NPN transistor 52 in a manner such that a malfunction causing closing of the contacts 50 will turn on the transistor 52, producing current flow in its load resistor 53 from a positive voltage supply line 54. The collector of the transistor 52 is connected through a resistor to the base of a similar NPN transistor 55 which likewise has a load resistor 56 and shares a common emitter resistor with the transistor 52. It will be noted that closing on the contacts 50 will result in turn-on of the transistor 52 and turn-off of the transistor 55, the latter being otherwise conductive. The outputs from the transistors 52 and 55 will appear on lines 57 and 58 going to poles of a switch 60. In the normally open mode of operation for the switch 50 as illustrated, the armature of the switch 60 will be in the upper position. The voltage on a line 61 connected to this armature will be high, virtually equal to the positive supply 54, until a malfunction occurs, and then will be a low voltage approaching ground potential. In a like manner, in the normally closed mode of operation for the switch 50, the switch 60 will be in the lower position and the voltage on the line 61 will be high until a malfunction occurs and then, as the switch 50 opens on malfunction, the transistor 52 will turn off, causing the transistor 55 to turn on and the voltage on the line 58 and line 61 to be reduced to a low voltage. Thus at all points in the system past the switch 60, the conditions of operation of the system will be exactly the same whether operating in the normally open or normally closed mode.

The line 61 is connected through a capacitor 62 and a diode 63 to the line 11 which, as explained above, is connected by a line 16 through the gate and delay circuit 17 to the counter 15. The capacitor 62 and its associated resistor connected to ground differentiate the negative going step function occurring upon malfunction and it is the resulting negative pulse coupled to the line 11 which initiates operation of the counter 15.

The voltage on the line 61 is also connected through a resistor to the base of a PNP transistor 65 so that a low voltage on the line 61 will cause the transistor 65 to turn on, applying the positive supply voltage on the line 54 to the collector and to a line 66. It will be noted that the voltage on the line 66 will be at ground potential until a malfunction occurs and then will step up to virtually V+ potential. It is this voltage that is coupled by the line 13 to the memory circuit 12 and was referred to above as the enabling voltage for the memory. Also, the voltage on the line 66 is connected to charge a capacitor 67 through a resistor, and this capacitor 67 is connected back through a resistor and a diode 68 to a switch 70. The poles of the switch are connected to the bases of the transistors 52 and 55. This feedback from the line 66 produces a latching function so that once a malfunction occurs and the voltage on the line 66 rises to the supply voltage the transistor 52, or 55, will be held in an on condition even though the malfunction is no longer present and the contact 50 open, or closed for the normally open mode.

The occurrence of a high voltage on the line 66 produced by a malfunction for this module, in addition to producing a negative pulse on the line 11 and an enabling voltage on the line 13, as well as latching the circuit, will also function to turn on the associated one of the lamps 29 on the indicator panel. The lamp 29 is turned on by means of a PNP transistor 73 and an NPN transistor 74, the latter having its base driven on by conduction of the transistor 73 and its collector and emitter circuit in series with the lamp 29 and another positive supply. The lamp 29 will thus be lighted when the voltage on the line 66 is high and at the same time a potential more negative than that on the line 66 is applied to the base of the transistor 73. This negative potential can be applied from two different sources, one for a flashing signal and another for producing a steady actuation of the light 29. The light 29 initially comes on flashing at a rate determined by a free running multivibrator made up of a pair of transistors 76 and 77 along with their associated load and bias resistors and cross coupling capacitors and diodes. This multivibrator will operate at a repetition rate of perhaps a few cycles per second to produce flashing clearly visible to an observer. The collector output of the transistor 77 is coupled to the base of a PNP transistor 78 such that as the transistor 78 is turned on and off, the emitter of this transistor will be switched between virtually ground potential and the supply potential. This emitter is coupled through a resistor and a diode 79 to the base of the transistor 73. In this manner, as soon as a malfunction occurs and the voltage on the line 66 rises to V+, the transistor 73 will be turned on and off at the rate of operation of the monostable circuit made up of the transistor 76 and transistor 77 so that the light 29 will flash on and off.

A bistable type circuit made up of a pair of NPN transistors 80 and 81 provides the function upon the closing of an acknowledge switch 82 of changing the operation of the lamp 29 from flashing to continuous. In addition, this bistable circuit provides a latching function and also prevents the flashing mode of operation of the lamp 29 after the first seven or other selected number of malfunctions have occurred. The transistor 81 will ordinarily be rendered conductive as soon as the voltage on the line 66 steps up, this being due to the fact that its collector is directly connected through a load resistor 83 to the V+ supply and its base is connected through a bias resistor and the load resistor 84 for the transistor 80 to the line 66. The emitters of the transistors 80 and 81 are connected to ground through a common diode 85, raising the emitter voltages of these transistors slightly above ground.

The transistor 81 will remain on after the voltage on the line 66 rises until such time as the acknowledge switch 82 is closed by the operator, whereupon the base voltage of the transistor 81 will be lowered and the transistor 81 will cut off, thus causing the transistor 80 to turn on due to the cross coupling. When the transistor 81 turns off, its collector voltage will rise to virtually V+ potential and, due to the coupling resistor from its collector to the base of the transistor 80, the transistor 80 will be held on. The collector voltage on the transistor 80 will thus drop to approaching ground potential, and this potential is applied by a line 89 to the base of the transistor 73, thus turning on the transistor 73 continuously by overriding the square wave voltage coupled into the base of this transistor from the flasher multivibrator through diode 79. Therefore, the lamp will be turned on continuously, rather than flashing, after the acknowledge switch 82 is depressed.

Initially, the transistor 80 is biased toward a cut-off condition by current flow from the positive supply through the load resistor 83 and on through the bias resistor, a line 91 connected to the base, and diode 92 and a resistor 93. The resistors in this path have values such that the base voltage will be lower than the emitter voltage so that the transistor 80 will not turn on until the acklowledge switch 82 is closed. The occurrence of a negative-going voltage on the line 61 further tends to initially insure that the transistor 80 is turned off by a negative pulse coupled through a capacitor 94 to a juncture point 95. However, it may be desired to prevent the light 29 from flashing after the selected number of malfunctions have occurred; for example, after the counter 15 has registered seven. Since the flashing light occurs when the transistor 81 is conductive and the transistor 80 is cut off, it is therefore necessary to insure that the reverse is true, i.e., that the transistor 80 will intially conduct upon the occurrence of a high voltage on the line 66 rather than the transistor 81. This operation is provided by a positive voltage applied to a terminal 48 from the lock-out amplifier 45 which prevents the capacitor 94 from charging, blocks the diode 92 and permits the voltage on the base of the transistor 80 to be at a higher level. A negative pulse from the line 61 will not be coupled through the capacitor 94 and reach the base of the transistor 80. Accordingly, when the voltage rises on the line 66, the transistor 80 will immediately begin to conduct, rendering inoperative the functions of the flashing circuitry as well as that of the acknowledge switch 82. The lamp 29 will thus come on steady instead of flashing for all of the modules 10 in which the malfunction occurs after the first preselected number, such as seven.

In the circuit of FIG. 3, provision is made for actuating a horn 72 when any one of the indicator units 10 senses a malfunction. For this purpose, the negative pulse applied to the bus line 11 for actuating the counter is also applied by a line 69 to the base of a transistor 87 which, along with a transistor 88, provides a bistable circuit. The transistors 87 and 88 are cross coupled so that when the negative pulse appears on the line 69 and the transistor 87 turns off, the transistor 88 will turn on. This will further turn on a transistor 90 which is in series with the horn 72. Thus, the horn will be actuated upon the occurrence of a malfunction, and will remain actuated so long as the transistor 88 is conductive. The transistor 88 may be cut off by shorting its base to ground or by cutting on the transistor 87 by either of two methods, one being by means of a diode 96 connected from the base of transistor 88 to ground through a "horn silence" button 99. The other is by means of a diode 98 connecting the base of the transistor 88 to the acknowledge button 82.

It will be noted that if the switch 97 is closed to silence the horn, the lamp 29 will continue to flash for the first seven indicator units 10 which detect malfunctions. This is the preferred mode of operation since the operator can then easily identify which units were the first seven so that he can later select these for readout to the display unit 40 to determine their sequence of failure. On the other hand, flashing of the lamp 29 for all of the units may be stopped by depressing the acknowledge button 82.

The circuit of FIG. 3 is reset to its original condition by means of a reset switch 71 which is connected between ground and the line 66. Depression the rest button lowers the voltage on the line 66 and discharges the latching capacitor 67. Of course, if malfunctions still exist, the circuit will indicate these again after the reset switch is opened.

Although shown in FIG. 3 as being associated with module 10, it will be understood that the flashing circuitry including the transistors 76–78, the horn 72 and its driver transistors 87, 88 and 89 the reset button 71, the acknowledge button 82, and the horn silence button 97 preferably are part of a separate module which would be shared in common by all of the modules 10 rather than this circuitry being repeated for each module. The test button 98, the reset button 71, the acknowledge button 82, and the horn silence button 97 are all located on the display panel as seen in FIG. 2.

In order to simulate a malfunction condition for test purposes, each of the modules has connected to the line 61 a switch 99 in series with a diode and resistor, the series circuit being connected to ground potential. Closing of the switch 99 produces a condition exactly like closing of the switch 50 and thus the operation of the system can be checked without producing a malfunction in the monitored condition. This test switch 99 would be shared in common by all of the modules 10.

Figure 4:
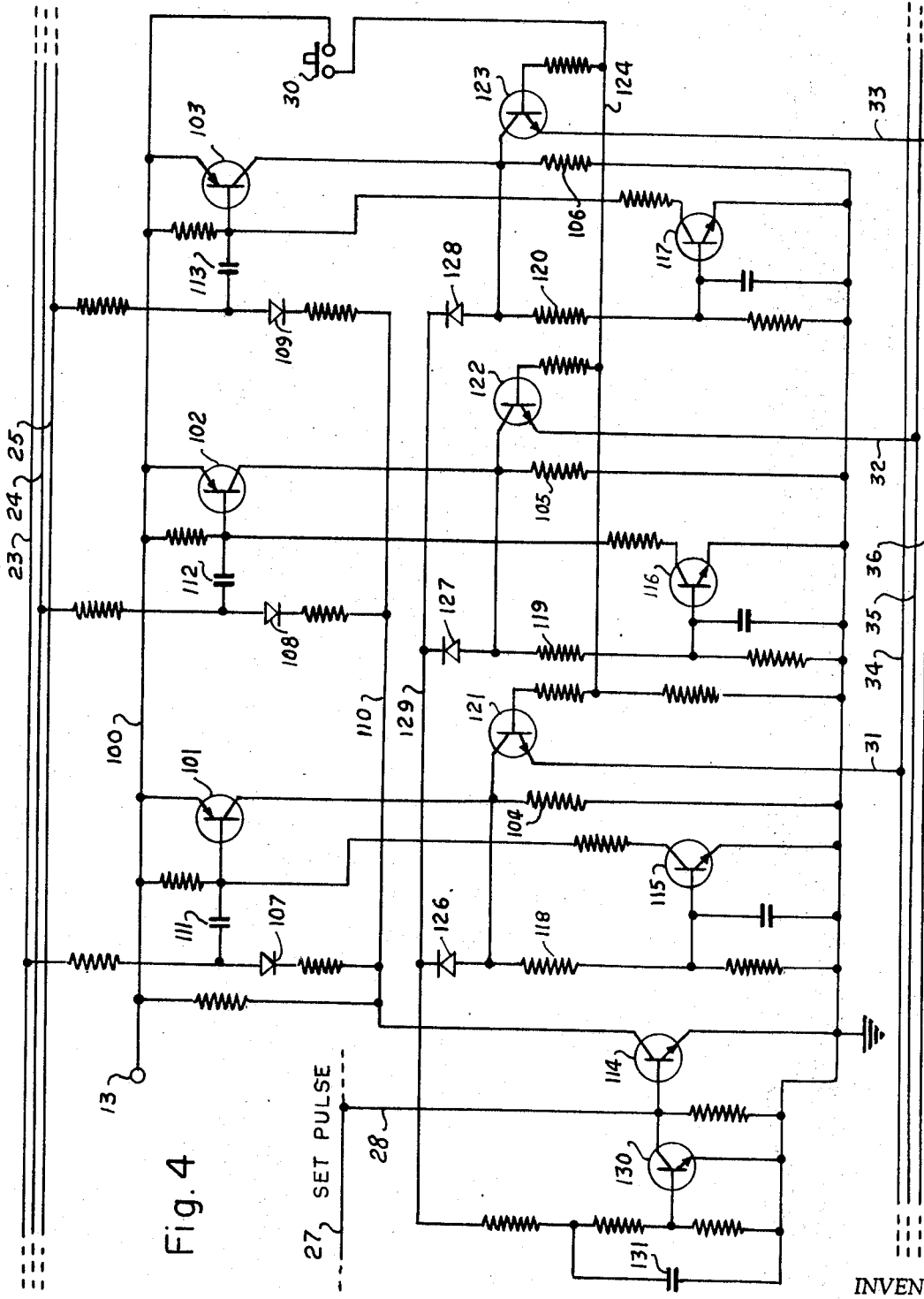
FIG. 4 is a schematic diagram of an electronic circuit which may be used for each of the memory elements in the annunciator system of FIG. 1.

Referring now to FIG. 4, a detailed schematic diagram of one of the memory circuits 12 is shown. This circuit functions to receive the numerical counter output information from the lines 23, 24 and 25 and, if an enabling voltage appears on the line 13 for this particular memory circuit 12, to store the counter output information when the delayed set pulse appears on the input 28. Upon demand, the memory can then deliver the stored information to the lines 31–33 going to the bus lines 34–36 from which the decoder and display are actuated. In FIG. 4, the line from the enabling output 13 from the module 10 is applied to a line 100 which is connected to the emitters of three PNP transistors 101, 102 and 103, these transistors having collector load resistors 104, 105 and 106 connected to ground. The potential on the line 13 or the line 100 will be high upon the appearance of a malfunction, as explained above, and will provide the collector-emitter bias for the transistors 101–103 so that these transistors will conduct if a negative potential is applied to their bases. Negative pulses are applied to the base electrodes of the transistors 101–103 in response to the potentials on the counter output lines 23–25 in the following manner. The lines 23–25 are connected through separate resistors and through diodes 107–109 to a line 110. The anodes of the diodes 107–109 are connected to the bases of transistors 101–103 by capacitors 111, 112 and 113. The line 110 is connected to ground through the collector-emitter path of an NPN transistor 114 which is driven into conduction upon the occurrence of the delayed set pulse from the gate and delay circuit 17 as it appears on the bus line 27 and input line 28. Thus, the transistor 114 is normally non-conductive, but is driven into conduction by the set pulse. Particular ones of the lines 23–25 will have positive voltages thereon corresponding to binary 1's indications, depending upon the number registered in the counter 15. These positive voltages alone will not function to turn on the transistors 101–103, but when the set pulse occurs on the line 28, the transistor 114 will be turned on, allowing conduction through the diodes 107–109. For the ones of the lines 23–25 which have positive voltages thereon, a negative-going pulse will be coupled through the capacitors 111–113 to momentarily turn on the associated ones of the transistors 101–103. Assume, for example, that the lines 23 and 25 had positive voltages thereon and the line 24 was at ground corresponding to the decimal number 5 in binary form, or 101. Such a condition will cause the transistors 101 and 103 to turn on but not the transistor 102.

For each of the transistors 101–103 a latching arrangement is provided to hold these transistors on if they are turned on by negative pulses coupled through the capacitors 111–113. The latching arrangement includes the circuitry associated with the three NPN transistors 115–117. Current flow through the load resistors 104–106 causes a positive voltage to be applied to the base of the associated one of the transistors 115–117 through the path including the resistors 118, 119 and 120. Across the base and emitter of each of the transistors 115–117 is an RC circuit which functions as a noise suppression filter. When one of the transistors 115–117 is turned on, current flow is permitted from the line 100 to ground through the collector-emitter of such transistors, causing the base of the associated one of the transistors 101–103 to be negative with respect to its emitter, tending to maintain such transistor in conduction. This in turn maintains a positive voltage across the associated ones of the resistors 104–106, thus holding the clamping transistor on. Accordingly, it will be seen that the binary information on the lines 23–25 will be transferred and stored in the form of conduction or non-conduction of the transistors 101–103 or in the form of either positive voltages or ground potentials appearing across the resistors 104–106. On demand, this information may be transferred out and applied to the lines 34–36 which drive the decoder 38 and display 40. This transfer is accomplished by means of NPN transistors 121–123 which have their collectors connected to resistors 104–106 and their emitters connected as the lines 31–33 to the bus lines 34–36. These transistors 121–123 may be all simultaneously driven into conduction, effecting transfer of the stored information, by a positive voltage applied to their bases by means of a line 124 which is connected to the line 100 through the pushbutton switch 30 as referred to above. All of the pushbutton switches 30 are located on the display panel.

It will be noted that the binary indication on the lines 23–25 will change each time another malfunction occurs in one of the modules 10. Since an enabling voltage will appear on the input 13 to memory circuits 12 which have previously been actuated, means must be provided to prevent subseqeunt count readings from affecting the information already stored in some of the memories 12. This is accomplished by preventing the delay pulse appearing on the line 28 from turning on the transistor 114. To this end, the positive voltage which will appear on at least one of the resistors 104–106 is coupled through one or more of three diodes 126, 127 or 128, through the line 129, to a voltage divider resistor arrangement connected at one junceture point to the base of a transistor 130. Such positive voltage will thus turn on the transistor 130 and short the set pulse to ground when it appears on the line 28. A capacitor 131 shunting the voltage divider delays the application of the positive voltage to the base of the transistor 130 to prevent premature termination of the initial operation of the circuit by cutting off the set pulse when the information is being stored.

Figure 5:
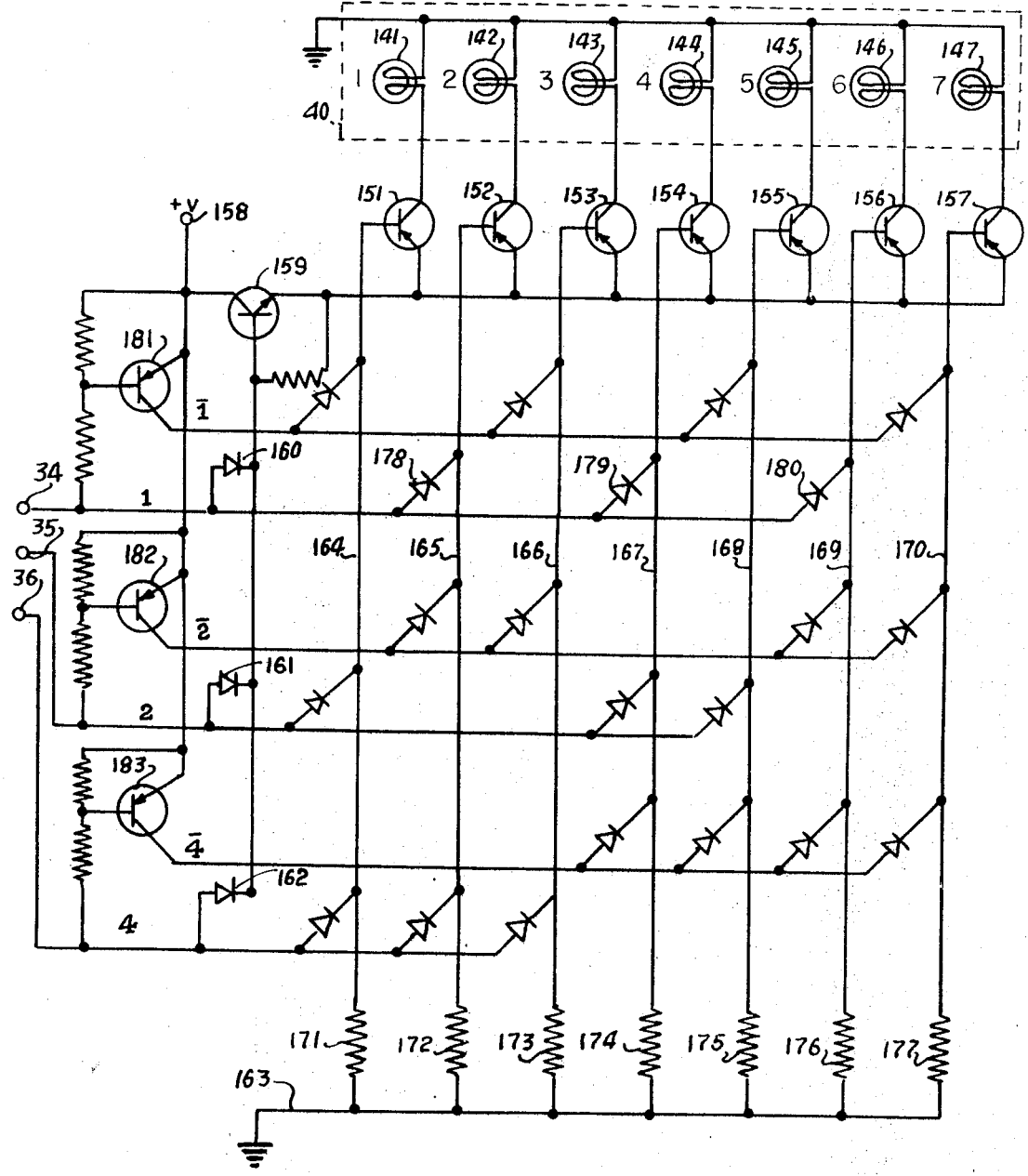
FIG. 5 is a schematic diagram of an electronic circuit which may be used to provide the decoder and display portions of the annunciator system of FIG. 1.

Referring now to FIG. 5, the decoder 38 and display 40 of FIG. 1 are shown in detailed schematic diagram form. The display 40 is illustrated as a plurality of lamps 141–147 which correspond to the decimal numbers 1 through 7. Preferably, this display is a projection type unit of conventional form. Such devices consist of a plug-in unit having a screen at one end and the lamps 141–147 at the other end, with each lamp having a mask between it and the screen so that when the lamp is activated, it projects the corresponding numeral on the screen. Various other display units of this type would, of course, be suitable. Each of the lamps is driven by one of seven PNP transistors 151–157. The emitters of all of these transistors are connected together and to a positive voltage supply 158 through the collector-emitter path of an NPN transistor 159. The transistor 159 will be turned on by a positive voltage applied to its base whenever a positive voltage appears on one or more of the bus lines 34–36, these lines being coupled to the base through diodes 160, 161 and 162. Thus, the supply voltage will not be available to transistors 151–157 except when a number appears on the decoder input lines 34–36. The bases of the transistors 151–157 are each separately connected to a ground line 163 by lines 164–170 and resistors 171–177. Absent other voltages applied to the lines 164–170, it is noted that the transistors 151–157 would all be in a conductive condition since their base voltages would be virtually at ground potential. Positive voltages are selectively applied to the lines 164–170 by a diode matrix to turn off all except one of the transistors 151–157 in accordance with the binary information appearing on the lines 34–36. To this end, the "1" line or the line 34 is connected to the lines 165, 167 and 169 by diodes 178, 179 and 180, respectively, so that if a positive voltage or 1 appears on the line 34, indicating inter alia that the number to be displayed is not a 2, 4 or 6, the transistors 152, 154 and 156 are rendered non-conductive by current flow through the diodes 178, 179 and 180 and resistors 172, 174 and 176. In like manner, a positive voltage appearing on the line 35, the 2 line, negates the possibility that a 1, 4 or 5 is to be displayed since the transistors 151, 154 and 155 are rendered non-conductive by positive voltages applied to lines 164, 167 and 168. Similarly, a positive voltage appearing on the line 36, the 4 line, negates display of a 1, 2 or 3 since positive voltages will appear on the lines 164, 165 and 166, rendering the corresponding transistors 151, 152 and 153 non-conductive.

To complete the decode logic circuitry, the complement of the number appearing on the lines 34–36 is generated and applied to the lines 164–170. To this end, a set of three PNP transistors 181, 182 and 183 is used, each having its emitter connected to the positive supply 158 and its base connected separately to one of the lines 34–36 with appropriate bias resistors. The collectors of these transistors are connected to a $\bar{1}$ line 184, a $\bar{2}$ line 185, and a $\bar{4}$ line 186. When the voltages on the lines 34–36 are down or indicate 0, the corresponding ones of the transistors 181–183 will be turned on full so that a voltage about equal to the positive supply 158 will appear on the lines 184 186. On the other hand, positive voltages appearing on the lines 34–36 will turn on transistors 181–183 and voltages on lines 184–186 will be low. With this arrangement, a zero or low voltage on the line 34 produces a $\bar{1}$ voltage on the line 184, negating the possibility of display of a 1, 3, 5 or 7 by conduction through diodes connected from the line 184 to the lines 164, 166, 168 and 170. In like manner a zero on the line 35 will turn on the transistor 182 and produce a $\bar{2}$ indication on the line 185, negating display of a 2, 3, 6 or 7 due to current flow from the line 185 to the lines 165, 166, 169 and 170 through diodes as shown, rendering the transistors 152, 153, 156 and 157 non-conducting. Completing the logic arrangement, a zero on the line 36 will turn on the transistor 183, producing a $\bar{4}$ voltage on the line 186, negating display of a 4, 5, 6 or 7 due to diodes connected from the line 186 to the lines 167, 168, 169 and 170.

It will thus be understood that the decode arrangement of FIG. 5 functions to turn on one and only one of the lamps 141–147 in accordance with the binary code appearing on the lines 34–36.

Referring now to FIG. 6, a detailed schematic diagram of the counter 15 is illustrated. In this circuit, positive pulses coupled through the gate circuit 17 and appearing on a line 18 will be counted and registered in three bistable counter circuits, the outputs of which are applied by lines 20–22 to the bus lines 23, 24 and 25. The first binary stage consists of a pair of NPN transistors 190 and 191 each having its collector connected to a positive supply line 192 through load resistance means and its emitter directly connected to a ground line 193. The collectors and bases of the transistors 190 and 191 are cross coupled by a resistance-capacitance arrangement to provide bistable operation in accordance with conventional practice. The first binary stage is in a binary zero condition when the transistor 190 is cut off and the transistor 191 is conductive, or indicates a one condition when the transistor 190 is conductive and the transistor 191 is cut off. The one condition is manifested by a conductance of an output transistor 194 which is turned on only if a voltage appears across the resistor connected between its base and emitter, this resistor forming part of the load impedance of the transistor 191. Conduction of the transistor 194 produces a positive voltage across its load resistor 195, this positive voltage being applied to the line 20 and the line 23 as a binary "1" indication. The conductive condition of the first binary stage is switched by a positive pulse appearing on the input 18 which is coupled through a diode and a pair of capacitors 196 and 197 to the bases of transistors 190 and 191. Each positive pulse will tend to turn on the non-conducting one of the transistors while having no effect on the transistor which is already conducting. As the non-conducting transistor begins to turn on, a negative going voltage will appear on its collector and this negative-going step will be coupled to the base of the conducting transistor, tending to turn it off, thus providing regenerative action. It will be seen that if the stage is initially in the zero condition, the transistor 190 conducting, then the first positive pulse supplied to the input 18 will turn on the transistor 191 and turn off the transistor 190, producing a count of 001. The next positive pulse at the input 18 will turn off the transistor 191 and turn on the transistor 190, returning the line 23 to ground or zero indication, and also applying a positive voltage step through a diode 198 to the base input of the next binary stage, switching its state to produce a binary count of 010 or decimal 2. The second binary stage includes a pair of transistors 200 and 201 corresponding to the transistors 190 and 191, and an output transistor 202 couples the output of the transistor 201 to the line 24, the 2 line. The output of the second stage is also coupled through a diode 203 to the input of the third binary stage which includes a pair of transistors 204 and 205, as well as an output transistor 206. The second binary stage including the transistors 200 and 201, as well as the third binary stage including the transistors 204 and 205, is exactly the same as the first binary stage as previously described. The 2's output appears on the line 21 and the 4's output is applied to the line 22. The binary stages in the counter 15 may all be reset to 0 upon the occurrence of a negative pulse applied to an input 207. This pulse functions to turn on a transistor 208, producing a positive voltage on a reset line 209 which is connected through separate resistors to the bases of transistors 190, 200 and 204. A positive voltage on the line 209 turns on these transistors which, of course, represent binary 0 when they are conducting.

Referring now to FIG. 7, the circuitry of the gate and delay arrangement 17 is illustrated in detailed schematic form. The circuitry of FIG. 7 provides several distinct functions. First, the pulses produced by the modules 10 upon the occurrence of malfunctions are coupled through this circuitry from the input 16 to the output 18 going to the counter. Second, a lock-out function is produced at line 44 for the purpose of changing the operation of the modules 10 after the selected number of malfunctions have occurred. Third, a delayed set output is produced on a line 26 for the purpose of rendering the memory circuits 12 operable after a delay which permits the counter to operate or ripple through. Fourth, a selector switch is provided for selecting the number of malfunctions which are to be counted or registered in the counter 15 and available for display at the unit 40.

The select function is provided by a three-pole seven-throw rotary switch 220. The three armatures of this switch, mechanically coupled to rotate together, are connected through diodes 211, 212 and 213 to a common terminal 214. This arrangement, along with a resistor 215 connected to the positive supply, provides an AND gate function to produce a positive voltage on the base of a transistor 216 when a positive voltage is present on all three of the switch armatures, or to produce a low voltage or ground potential when any one of the switch armatures is at a low voltage. The voltage at the terminal 214 or the base of the transistor 216 will be low, maintaining the transistor turned off, until such time as the count registered on the lines 20–22 reaches the selected number of malfunctions to be counted. This is accomplished by making appropriate connections from the lines 20–22 to selected poles of the switches, and from a positive supply line V+ to selected other poles of the switches. Note, for example, that the "1" line, or the line 20, is connected by the line 41 to the 1, 3, 5 and 7 positions of the first section of the switch while the remaining positions are connected to the positive supply line V+. The "2" line, the line 21, is connected by the line 42 to the 2, 3, 6 and 7 positions of the second section of the switch, the remaining positions of this section being connected to the positive line V+. Finally, the "4" line is connected by the line 43 to the 4, 5, 6 and 7 positions of the third section of the switch, the 1, 2 and 3 positions being connected to the positive supply V+. The voltages appearing on the lines 20–22 will be either at positive values representing 1 or virtually ground representing 0. Assume that the switch armatures are rotated to the 7th position in each section, in which case it will be seen that for a 000 count indication on the lines 20–22, a low voltage will appear on the armatures in all three sections of the switch, and the voltage at the terminal 214 will be low. This condition will continue as the count on the lines 20–22 proceeds up through six or 110 since for each of the numbers up to but not including 7, at least one of the lines will be at a 0 or low voltage, permitting at least one of the diodes 211–213 to conduct. When the count 7 or 111 is reached, all of the lines 20–22 will be at a positive value, none of the diodes 211–213 will conduct, the terminal 214 will be at a positive voltage, and the transistor 216 will be conductive. Thereafter, count pulses will be prevented from reaching the output 18. On the other hand, if some other number of malfunctions to be counted is selected, such as 4, the armatures of the switches would be rotated to the selected position, as 4, and it is seen that in this condition the voltage at the terminal 214 will remain low until the number 4 or 100 is indicated on the lines 20–22, i.e., a positive voltage appears on the line 22, at which time the voltage at the terminal 214 will rise and turn on the transistor 216. When the transistor 216 is turned on, the resulting voltage appearing across the emitter resistance turns on a transistor 217 which functions to block any further of the pulses produced by malfunctions from reaching the counter 15 and also to actuate the lock-out amplifier.

Negative pulses appearing on the line 16 are applied through a resistor and capacitor to the base of a transistor 218 in FIG. 7. When the transistor 218 is turned on by these negative pulses, a positive voltage appears on the base of a transistor 219, turning this transistor on and producing a voltage drop across its load resistor. The collector of the transistor 219 is connected through a capacitor to the base of a PNP transistor 220, while another capacitor shunts a load resistor of the transistor 219. Transistor 220 is momentarily driven into conduction when the transistor 219 conducts and the resulting voltage appearing across the load resistor of the transistor 220 is coupled to the input 18 of the counter 15. It will be noted that when the transistor 217 turns on, the output current from the transistor 218 will pass through this transistor and prevent a sufficiently positive voltage from appearing on the base of the transistor 219 to drive it into conduction and so none of the succeeding pulses appearing on the line 16 will be coupled through the transistors 219 and 220 to reach the output 18. Thus, the number registered in the counter will remain the same regardless of further malfunctions.

The collector of the transistor 217 is connected by the line 44 to the lock-out amplifier 45 which is merely a single stage amplifier of conventional form. Turn on of the transistor 217 in effect produces a negative-going input to the amplifier 45. When this occurs, the amplifier 45 produces at its output 46 a positive voltage level which, when applied at the input 48 of the modules 10, will function to prevent the flashing mode of operation of the indicator lamps 29 or energization of the horn 72.

The collector output of the transistor 220 is further coupled through a capacitor 221 to the base of a transistor 222, the base also being connected through a resistor 223 to ground. The transistor 222 will be normally conductive since emitter base bias current will flow to ground through resistor 223. A positive output produced at the collector of the transistor 220, however, will serve to turn off the transistor 222 until the capacitor 221 has charged. While the transistor 222 is conductive, the voltage across its collector load resistor, as coupled back to the base of the transistor 220 by a parallel resistor-capacitor combination, will not aid in turning on the transistor 220. However, as the transistor 222 is driven toward cutoff, a negative-going voltage change coupled back to the base of transistor 220 tends to maintain this transistor turned on. The effect of this will be to slightly delay the occurrence of a positive pulse applied to the base of a transistor 225 from the collector of the transistor 222 through the series resistance-capacitance circuit. Turn on of the transistor 225 by a positive pulse also turns on a PNP transistor 226, producing the set output on the line 26 as discussed above. This set output appearing on the bus line 27 and at the inputs 28 to all of the memories 12 is thus delayed slightly from the occurrence of the count pulse to permit the counter 15 to operate before the memories are conditioned to store the counter output.

While the system described uses a single display unit 40 to display upon command the numbers stored in all of the memories 12, it will be understood that a separate numerical display device may be associated with each memory. Referring to FIG. 4, it will be seen that these individual display units may be provided by first eliminating the transistors 121–123 along with their associated base bias resistors and the line 124 onto the pushbutton 30 which would no longer be needed. Of course, the lines 31–36 as well as the decoder 38 and display 40 would no longer be part of this system. Substituting for these elements in each of the memory circuits 12 would be an individual display unit connected to receive the output across the resistors 104–106. Such a unit may take the form of a meter having the scale marked with the numbers 1 through 7, for example, and having the meter coil receiving current from across the resistors 104–106 through weighting resistors proportioned in accordance with the 1, 2 and 4 digits. Of course, various other types of display units could be used to read out the numbers stored in the memory circuits 12, the primary factor influencing selection of a particular type of display being the complexity or cost.

The indicator module of FIG. 3 utilized in the system of this invention is described and claimed in a copending application, Ser. No. 588,847, filed Oct. 24, 1966, by Lester H. Porter, Jr., for Indicator Modules for Annunciator Systems, assigned to assignee of the present invention.

While the annunciator system of this invention has been described with reference to a particular embodiment, it is of course understood that this description is not to be construed in a limiting sense. Other embodiments of the invention, as well as modifications of the disclosed embodiments, will be apparent to persons skilled in the art upon reference to this application.

What is claimed is:

1. An annunciator system for producing a readout of the sequence in which malfunctions occur at a plurality of stations comprising:

a plurality of indicator modules each of which detects the occurrence of a malfunction at one of said stations, the indicator modules switching to a set condition and producing a count pulse and an actuating output when said malfunction occurs, each indicator module producing a first visual indication when switched to said set condition and a second visual indication when a lockout signal is applied thereto when in the set condition, counter means connected to receive said count pulses from all of said indicator modules and to register said pulses, with means for producing a set output after each number is registered in the counter and means for producing said lockout signal after a selected number of said pulses is registered and applying said lockout signal to said plurality of indicator modules, a plurality of storage means each of which is associated with a different one of the indicator modules, each storage means being connected to receive a representation of the number registered in the counter and to store such number if said set output is received by such storage means from said counter means when said actuating output is applied to the storage means from the associated indicator module, and display means connected to receive the outputs of said storage means and adapted to produce a representation of the numbers stored therein.

2. An annunciator system according to claim 1 wherein the counter means ceases to produce said set output after registering said selected number of count pulses.

3. An annunciator system according to claim 2 wherein each of the storage means is latched after a number is stored therein to prevent subsequent numbers from being entered therein.

4. An annunciator system according to claim 3 wherein the display means is selectively coupled to receive the output of only one of said storage means at a given time.

5. An annunciator system according to claim 4 wherein the storage means are individually read out to the display means by actuating means associated with the visual indication of each indicator module.

6. An annunciator system according to claim 5 wherein each of the indicator modules includes: trigger means to produce a first output when the malfunction has not occurred and a second output when the malfunction has occurred, said count pulses being produced at the output of the trigger means when it switches to the second output, a gate having an input connected to receive the outputs of said trigger means and having an output which is at a first level when said first output exists and is at a second level when said second output exists, said actuating output being produced at the output of the gate when it switches to the second level, a bistable circuit coupled to said gate and having two stages neither of which is conductive when said first level exists, the bistable circuit being switched to a first stable state when said second level is produced at the gate output, the visual indication being actuated through gating means from said gate so that the visual indication is not actuated when said gate output is at said first level and may be actuated in a flashing mode and a continuous mode when said second level exists, means for applying an alternating signal to said gating means to produce said flashing mode, means for coupling the output of said bistable circuit to said gating means to produce said continuous mode when said bistable circuit is in a second stable state, an audible signal device connected to said bistable circuit to be actuated when the bistable circuit is in said first stable state and silent when the bistable circuit is in the second stable state and when neither of said stages is conductive, differentiating means coupling the output of the trigger means to the bistable circuit to cause it to assume said first stable state when the trigger means switches from the first output to the second output, the lockout indication preventing the output of the trigger means from being applied to the bistable circuit, and latching means connecting the output of the bistable circuit to said gate to cause the gate to produce said second level so long as the bistable circuit is in one of said stable states, said second level defining said set condition.

7. An annunciator system comprising:

a plurality of condition responsive means each of which detects the occurrence of a predetermined condition and switches to a set condition in response thereto, each said means producing a count signal and an enabling output when switched to said set condition, each said means producing a first type of indication when switched to said set condition and producing a second type of indication when switched to the set condition when a lock-out input is applied thereto, counter means connected to receive said count signals from all of said condition responsive means through gating means and to register a selected number thereof, the counting means functioning to close said gating means after said selected number is registered therein to prevent registering of any further count signals and also functioning to apply a lock-out input to each of said condition responsive means after said selected number has been registered, and further to produce a delayed signal after each of said count signals, a plurality of storage means, each being associated with a different one of said condition responsive means and connected to receive said enabling output therefrom, the storage means being connected to the output of said counter means to receive the number registered therein and also to receive said delayed signal which functions to cause the storage means to store the number registered in the counter means if an enabling output is received from the associated condition responsive means, the storing of a number in each said storage means functioning to prevent any subsequent number appearing at the output of said counting means from being entered into such storage means, each of said storage means producing at its output a representation of the number stored therein upon the application of a readout command thereto, display means connected to receive the output of all of said storage means and functioning to produce a visual indication of the numbers stored therein upon selective application of readout commands to individual ones of said storage means.

References Cited

UNITED STATES PATENTS

Re. 24,031    6/1955    Marmorstone _____ 340—415 X
3,138,791    6/1964    Beguin _____ 340—415

THOMAS B. HABECKER, Primary Examiner

C. M. MARMELSTEIN, Assistant Examiner

U.S. Cl. X.R.

340—166